United States Patent
Matsuda et al.

(10) Patent No.: US 7,673,504 B2
(45) Date of Patent: Mar. 9, 2010

(54) APPARATUS AND METHOD FOR DETECTING AN INTERNAL MECHANICAL FAILURE OCCURRING IN A TIRE

(75) Inventors: Jun Matsuda, Hiratsuka (JP); Tsuyoshi Kitazaki, Hiratsuka (JP); Naoshi Miyashita, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 374 days.

(21) Appl. No.: 11/624,619

(22) Filed: Jan. 18, 2007

(65) Prior Publication Data

US 2007/0164853 A1    Jul. 19, 2007

(30) Foreign Application Priority Data

Jan. 19, 2006    (JP)    ............... 2006-011061

(51) Int. Cl.
*B60C 23/02*    (2006.01)
(52) U.S. Cl. ..................... 73/146.5; 340/442
(58) Field of Classification Search ............... 73/146, 73/146.5; 340/442
See application file for complete search history.

(56) References Cited

U.S. PATENT DOCUMENTS

| | | | |
|---|---|---|---|
| 6,028,508 A | 2/2000 | Mason | |
| 6,960,994 B2* | 11/2005 | Tabata et al. | ................. 340/442 |
| 7,320,246 B2* | 1/2008 | Schick et al. | ................. 73/146 |
| 2002/0006987 A1 | 1/2002 | Nakayama et al. | |
| 2004/0095231 A1 | 5/2004 | Ichinose | |
| 2007/0176763 A1* | 8/2007 | Murakami et al. | ........... 340/443 |

FOREIGN PATENT DOCUMENTS

| | | |
|---|---|---|
| JP | 62-295709 | 12/1987 |
| JP | 2003-034111 | 2/2003 |
| JP | 2003-054228 | 2/2003 |
| JP | 2003-072330 | 3/2003 |
| JP | 2003-080912 | 3/2003 |
| JP | 2003-034111 | 4/2003 |
| JP | 2003-226120 | 8/2003 |
| JP | 2004-359203 | 12/2004 |
| JP | 2005-029144 | 2/2005 |
| JP | 2005-145170 | 6/2005 |
| JP | 2005-182570 | 7/2005 |
| JP | 2005-528270 | 9/2005 |
| JP | 2005-286929 | 10/2005 |
| JP | 2005-335664 | 12/2005 |
| JP | 2007-003379 | 1/2007 |
| JP | 2007-003379 | 11/2007 |

* cited by examiner

*Primary Examiner*—Andre J Allen
(74) *Attorney, Agent, or Firm*—Knobbe Martens Olson & Bear, LLP

(57) ABSTRACT

An apparatus and method derives a deformation amount of a contact-portion of the tire based on the tire information, the contact-portion being in contact with the ground, and calculates an evaluation value based on the derived deformation amount, and comparing the calculated evaluation value with a reference value to determine whether or not the internal mechanical failure has occurred in the tire.

15 Claims, 8 Drawing Sheets

APPARATUS AND METHOD FOR DETECTING AN INTERNAL MECHANICAL FAILURE OCCURRING IN A TIRE

CROSS REFERENCE TO RELATED APPLICATION

This application claims the benefit and priority to Japanese Application Number 2006-011061 filed on Jan. 19, 2006. The disclosure of the above-described application is hereby incorporated by reference in its entirety.

BACKGROUND OF THE INVENTION

The present invention relates to an apparatus and a method which are capable of detecting an internal mechanical failure occurring in a tire in a state where a vehicle having a wheel with the tire mounted thereto is traveling.

In a case where a failure such as a separation (peeling damage between a rubber and a belt constituting a tire or between rubbers) occurs in a tire for some reason during traveling of a vehicle, if the vehicle continues to travel in a state where the failure is occurring, for example, a burst may suddenly occur in the tire to make the traveling impossible, and as a result, there is a possibility that a traffic accident may be caused. In a case where a failure such as a separation occurs in a tire, it is very important in terms of safety to detect the failure rapidly and warn a driver or the like of the failure. For this purpose, a product tire is examined before shipping using, for example, an X-ray nondestructive tester. During production of a tire in a case where there is an internal mechanical failure caused by contamination of a foreign matter or the like in a tire material in molding and vulcanization processes, the internal mechanical failure can be found by the examination before shipping. Further, in a case where it is assumed that the product has low durability from a tire structure, rubber physical properties, and the like, a durability test is previously conducted as a commodity test. In the commodity test, the durability is evaluated by an indoor durability test using drum-type durability test apparatus which is generally conducted, whereby an index of durability as a tire to be actually mounted to the vehicle in the common road is obtained.

However, for example, in the examination before shipping using the X-ray nondestructive tester, although a large separation occurred in the tire can be detected, a separation that is caused by a load during traveling to proceed cannot be detected (predicted). Further, even when the index of durability can be obtained by the indoor durability test using drum-type durability test apparatus, according to the durability test as described above, only a part of a load state (a load capacity, an air pressure, a road temperature, a traveling pattern, etc.) applied to the product tire that is being used in a state where the tire is actually mounted to a vehicle can be reproduced. More specifically, each of the load states of the product tire that is being used in a state where the tire is actually mounted to a vehicle cannot be reproduced individually in the durability test. Presence/absence of the occurrence of the internal mechanical failure such as the separation cannot be predicted exactly for each product tire that is being used in a state where the tire is actually mounted to a vehicle by using only the index of durability obtained by the durability test conducted under limited conditions as described above. Therefore, conventionally, there has been a demand for an apparatus capable of rapidly detecting an internal mechanical failure such as a separation that occurs during traveling of a vehicle for a product tire that is being used in a state where the tire is actually mounted to a vehicle, and a method therefor.

Conventional means for detecting a failure occurring in a tire mounted to a vehicle is disclosed in, for example, JP 2003-80912 A and JP 2003-72330 A. JP 2003-80912 A discloses an abnormality detection system of a tire. JP 2003-90912 A discloses that, according to the tire abnormality detection system, changes in vibration and sound of a tire mounted to a vehicle during traveling are measured, the measurement results are subjected to frequency analysis, and a state of the tire is determined using results of the frequency analysis, whereby a driver can be informed of the abnormality of the tire with accuracy. Further, JP 2003-72330 A discloses a tire monitoring system. JP 2003-72330 A discloses that, according to the tire monitoring system, the air pressure and internal temperature of a tire are detected, and in a case where the air pressure becomes lower than a previously set value and the internal temperature of the tire becomes higher than a previously set temperature, it is determined that there is an abnormality in the tire, whereby a tire blowout and an abnormality state which may cause the tire blowout can be detected.

Patent Document 1 describes that, according to the tire abnormality detection system, the abnormality of a tire is detected based on the measured change in the vibration or sound of a tire. However, in an actual vehicle, the states of the vibration and sound of a tire vary depending on changes of various factors such as a condition of a road surface on which the vehicle actually travels, and traveling conditions (speed and weight) of the vehicle. The variations in the states of the vibration and sound include a number of components corresponding to the changes in the state of the road surface and traveling conditions of a vehicle, i.e., a number of noise components. In the tire abnormality detection system described in JP 2003-80912 A, the abnormality of a tire cannot be detected with sufficient precision due to an influence of the noise components. Further, in the tire monitoring system described in JP 2003-72330 A, an internal mechanical failure of a tire is detected based on the air pressure and internal temperature of the tire. However, the inventors of the present application confirmed that in a state where a failure such as a separation has occurred in the tire, changes do not appear so remarkably in the air pressure and internal temperature of the tire. Specifically, a vehicle with a tire having no internal mechanical failure mounted thereto was allowed to travel continuously for one hour, and the temperature and internal pressure of the tire were detected respectively before and after the traveling. Then, an identical tire (with the same size and air pressure) in which a separation has occurred was mounted to the same vehicle, and the vehicle was similarly allowed to travel continuously for one hour, and the temperature and internal pressure of the tire were detected respectively before and after the traveling. Consequently, irrespective of whether the internal mechanical failure (separation) has occurred in the tire, no change in the internal pressure of the tire was recognized before and after the continuous one-hour traveling, and a significant difference was not recognized in a change of temperature either. With the tire monitoring system described in JP 2003-72330 A, a failure such as a separation occurring in a tire cannot be detected with sufficient precision.

SUMMARY OF THE INVENTION

In order to solve the above-mentioned problems, it is an object of the present invention to provide a tire internal mechanical failure detection method and a tire internal mechanical failure detection apparatus which are capable of detecting an internal mechanical failure occurring in a tire with high precision while a vehicle having a wheel with a tire mounted thereto is traveling.

In order to solve the above-mentioned problems, the present invention provides an apparatus for detecting an internal mechanical failure of a tire that is attached to a wheel of a vehicle while the vehicle is traveling, including: an information acquiring part for acquiring tire information on the tire during rotating while the vehicle is traveling; a deriving part for deriving a deformation amount of a contact-portion of the tire based on the tire information, the contact-portion being in contact with the ground; a calculating part for calculating an evaluation value based on the derived deformation amount; and a determining part for comparing the calculated evaluation value with a reference value to determine whether or not the internal mechanical failure has occurred in the tire.

It is preferable that the information acquiring part acquires acceleration data of a predetermined portion of the tire in time series as the tire information, said acceleration generated when the tire receives an external force from a road surface while the vehicle is traveling, and the deriving part obtains the deformation amount of the contact-portion by using the acceleration data of the tire in time series acquired in the information acquiring part.

It is preferable that the apparatus according to claim 1, further including an acceleration sensor placed on an inner surface of the predetermined portion of the tire for measuring the acceleration data of the predetermined portion.

Further, it is preferable that the apparatus further including a transmitter provided in the wheel, the transmitter transmitting the acceleration data measured by the acceleration sensor to the information acquiring part by wireless; and the information acquiring part includes a receiver for receiving the acceleration data transmitted by wireless.

A Further, it is preferable that the deriving part extracts acceleration data due to a deformation of the tire in time series from the acceleration data, and performs a second-order time integration with respect to the acceleration data due to the deformation of the tire to obtain displacement data, thereby calculating the deformation amount of the tire.

It is preferable that the deriving part obtains deformation amounts of the contact-portion in a tire circumferential direction and a tire width direction, and the calculating part calculates the evaluation value based on the deformation amounts in said two directions.

Further, it is preferable that the calculating part calculates a value represented by using one of $X_{max}/Y_{max}$ and $Y_{max}/X_{max}$ as the evaluation value, $X_{max}$ being a maximum value of the deformation amount of the contact-portion in the tire circumferential direction, and $Y_{max}$ being a maximum value of the deformation amount of the contact-portion in the tire width direction Further, it is preferable that the calculating part calculates a value represented by using one of $\tan^{-1}(X_{max}/Y_{max})$ and $\tan^{-1}(Y_{max}/X_{max})$ as the evaluation value.

Further, it is preferable that the calculating part calculates a value represented by $X_{max} \times Y_{max}$ as the evaluation value, $X_{max}$ being a maximum value of the deformation amount of the contact-portion in the tire circumferential direction, and $Y_{max}$ being a maximum value of the deformation amount of the contact-portion in the tire width direction Further, it is preferable that the deriving part derives the deformation amount of the contact-portion in a tire circumferential direction, and the calculating part calculates the evaluation value based on a maximum value of the deformation amount of the contact-portion in the tire circumferential direction.

Further, it is preferable that the deriving part derives the deformation amount of the contact-portion in a tire width direction, and the calculating part calculates the evaluation value based on a maximum value of the deformation amount of the contact-portion in the tire width direction.

Further, the present invention also provides a method of detecting an internal mechanical failure of a tire that is attached to a wheel of a vehicle while the vehicle is traveling, including: an information acquiring step of acquiring tire information on the tire during rotating while the vehicle is traveling; a deriving step of deriving a deformation amount of a contact-portion of the tire based on the tire information, the contact-portion being in contact with the ground; a calculating step of calculating an evaluation value based on the derived deformation amount; and a determining step of comparing the calculated evaluation value with a reference value to determine whether or not the internal mechanical failure has occurred in the tire.

According to the tire internal mechanical failure detection method and the tire internal mechanical failure detection apparatus of the present invention, in a vehicle having a wheel with a tire mounted thereto, an internal mechanical failure occurring in the tire can be detected with high precision under the condition that the vehicle is traveling.

BRIEF DESCRIPTION OF THE DRAWINGS

In the accompany drawings:

FIGS. 3A and 3B are views illustrating a force applied to a portion of a tire that is in contact with the ground while a vehicle is traveling, in which: FIG. 3A is a view showing a tire of a vehicle shown in FIG. 1 seen from a road surface side; and FIG. 3B is a graph showing a deformation amount in a time series in a circumferential direction of the tire and a deformation amount in a time series in a width direction of the tire, respectively;

DETAILED DESCRIPTION OF THE PREFERRED EMBODIMENT

Hereinafter, the tire internal mechanical failure detection apparatus and the tire internal mechanical failure detection method of the present invention will be described in detail based on preferable embodiment shown in the attached drawings.

Figure 1:
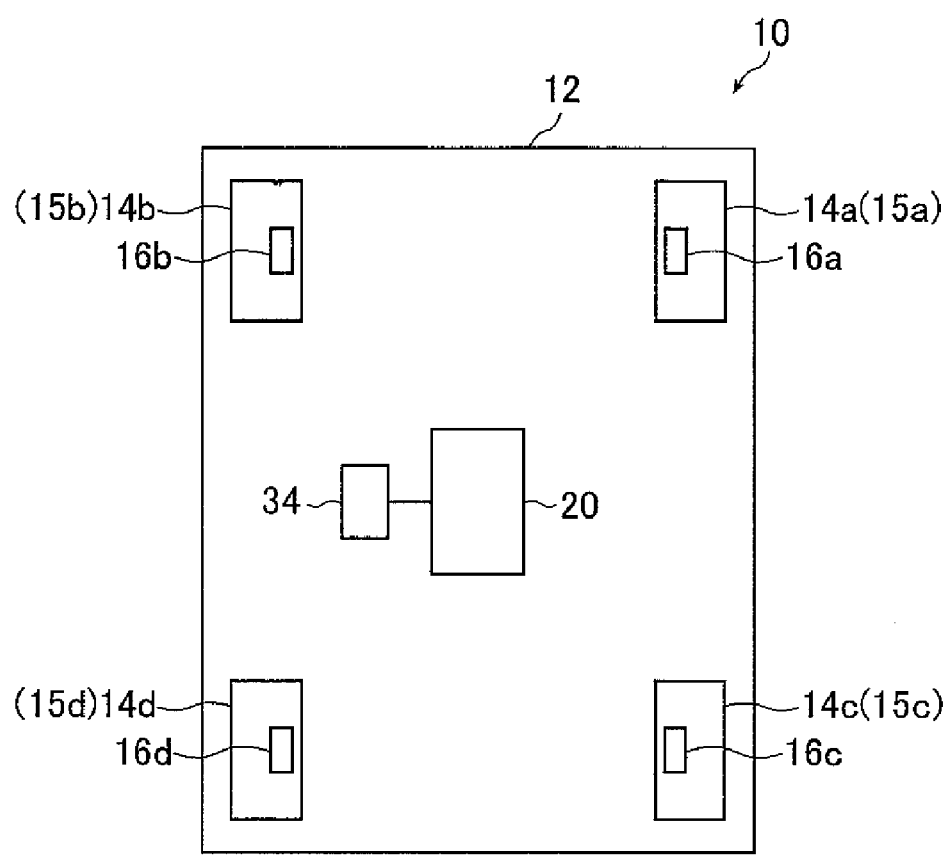
FIG. 1 is a schematic structural view illustrating an example of a tire internal mechanical failure detection apparatus according to an embodiment of the present invention.

FIG. 1 is a schematic structural view illustrating a tire internal mechanical failure detection apparatus 10 (apparatus 10) that is an embodiment of the tire internal mechanical failure detection apparatus of the present invention. The apparatus 10 includes four wheels 14a to 14d on a vehicle 12. The four wheels 14a to 14d are configured so that tires 15a to 15d of the same kind (i.e., the tires having the same tire size, tire rim width, belt structure, filled air pressure, and the like) are mounted respectively. The apparatus 10 is composed of sensor units 16a to 16d, a data processing unit 20, and a display 34. The sensor units 16a to 16d are provided respectively in the four wheels 14a to 14d, and acquire acceleration information on predetermined portions of the tires 15a to 15d (hereinafter, collectively referred to as the tire 15) generated when the tire 15 of each wheel receives an external force from a road surface when the vehicle 12 is traveling on the road surface, and transmit the information with a radio signal (by wireless).

The data processing unit 20 receives radio signals respectively transmitted from the sensor units 16a to 16d (by wireless). Then, the data processing unit 20 extracts deformation acceleration information in a tire radial direction (R-direction deformation acceleration data) of each tire, deformation acceleration information in a tire circumferential direction (C-direction deformation acceleration data) of each tire, and deformation acceleration information in a tire width direction (W-direction deformation acceleration data) of each tire from the received radio signals. Then, the data processing unit 20 obtains a ground-contact timing (timing at which an acceleration sensor 2 fixed on an inner circumferential surface of a tire hollow region comes to (most approaches) the center position of the contact-portion of the tire) of a predetermined portion of the tire 15 from the R-direction deformation acceleration data. Then, the data processing unit 20 derives the deformation amount data in a tire circumferential direction of the contact-portion (C-direction deformation amount data) of each tire from the extracted C-direction deformation acceleration data, and the deformation amount in a tire width direction of the contact-portion (W-direction deformation amount data) of each tire from the extracted W-direction deformation acceleration data, using the ground-contact timing. Then, the data processing unit 20 calculates an evaluation value for determining the presence/absence of the occurrence of an internal mechanical failure of each tire, based on the C-direction deformation amount data of each tire and the W-direction deformation amount data of each tire. Then, the data processing unit 20 compares the calculated evaluation value with a predetermined reference value to determine whether or not an internal mechanical failure has occurred in the tire. In this embodiment, as described later, in order to derive the ground-contact timing of a predetermined portion of the tire 15 with high precision, deformation acceleration information in a tire radial direction is used. In the present invention, the ground-contact timing of a predetermined portion of the tire 15 may be derived from any one of the C-direction deformation acceleration data of each tire and the W-direction deformation acceleration data of each tire. The data processing unit 20 only needs to be able to extract at least the C-direction deformation acceleration data of each tire and W-direction deformation acceleration data of each tire from the received radio signal. In the case where it is desired that the ground-contact timing of a predetermined portion of the tire 15 is derived with higher precision, and an internal mechanical failure of the tire is detected with higher precision, it is preferable to extract the deformation acceleration information in a tire radial direction of each tire from the received radio signal.

The display 34 displays the C-direction deformation amount data and the W-direction deformation amount data derived in the data processing unit 20, the determination results regarding whether or not an internal mechanical failure has occurred in the tire, and the like. The display 34 is configured so as to also be able to generate a warning informing a driver driving the vehicle 12 of the occurrence of an internal mechanical failure in the tire, particularly in the case where it is determined that the internal mechanical failure has occurred in the tire in the data processing unit 20. In this embodiment shown in FIG. 1, the data processing unit 20 is arranged in the vehicle 12. However, the data processing unit 20 is portable, and is not limited to the arrangement in the vehicle 12.

Figure 2:
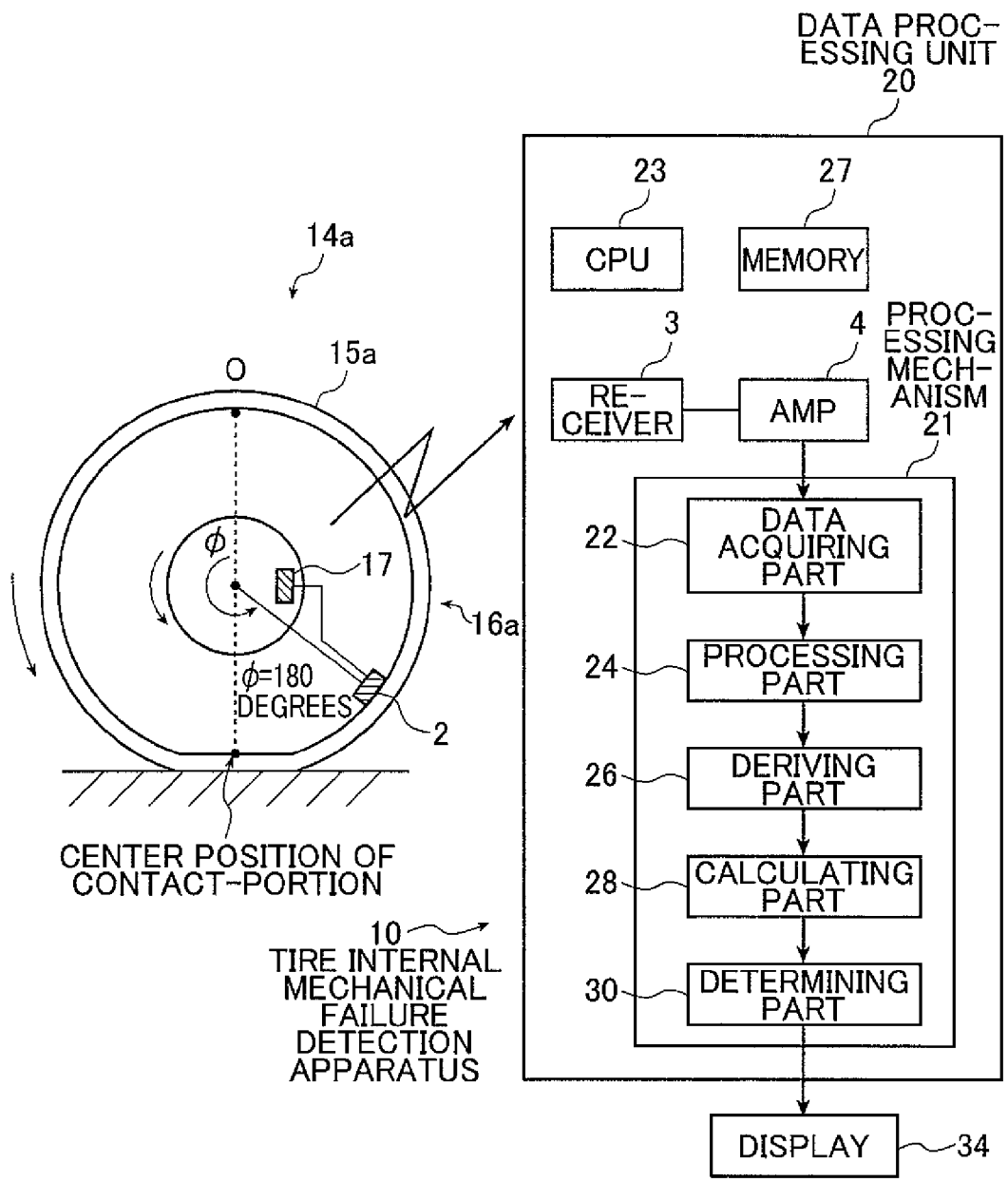
FIG. 2 is a view illustrating a sensor unit and a data processing unit in the tire internal mechanical failure detection apparatus shown in FIG. 1.

FIG. 2 is a schematic structural view illustrating the sensor units 16a to 16d (hereinafter, collectively referred to as a sensor unit 16) and the data processing unit 20 in the apparatus 10 shown in FIG. 1. The sensor units 16a to 16d have the same configuration, so that only the sensor unit 16a and the wheel 14a in which the sensor unit 16a is provided are shown.

The sensor unit 16 is composed of the acceleration sensor 2 and a transmitter 17. The acceleration sensor 2 is placed on the inner circumferential surface of the hollow region of the tire 15, and acquires acceleration information on a predetermined portion (setting position of the acceleration sensor 2) of the tire 15 generated when the tire 15 of each wheel receives an external force from a road surface, and transmits the information with a radio signal (by wireless). Measurement data of an acceleration is transmitted from the transmitter 17 of each transmission unit to a receiver 3 of the data processing unit 20. It may also be possible that, for example, the acceleration sensor 2 is allowed to have a transmission function without providing the transmitter 17, whereby a radio signal is transmitted from the acceleration sensor 2 to the receiver 3. Each transmitter 17 provided in the wheels 14a to 14d retains identification information (ID) enabling each identification, and the transmitter 17 transmits an ID together with the measurement data of an acceleration measured by the corresponding acceleration sensor.

As the acceleration sensor 2, for example, a semiconductor acceleration sensor disclosed in Japanese Patent Application No. 2003-134727 filed previously by the applicant of the present application is illustrated. Specifically, the semiconductor acceleration sensor includes a Si wafer with a diaphragm formed in a Si wafer outer circumferential frame portion, and a platform for fixing the wafer outer circumferential frame portion. In a center portion of one surface of the diaphragm, a weight is provided, and a plurality of piezoelectric resistors are formed in the diaphragm. In the case where an acceleration acts on the semiconductor acceleration sensor, the diaphragm is deformed, and the resistance of the piezoresistors changes due to the deformation. A bridge circuit is formed so as to be able to detect this change as information on an acceleration. By fixing the acceleration sensor on a tire inner circumferential surface so that the acceleration in a tire radial direction, the acceleration in a tire circumferential direction, and the acceleration in a tire width direction can be measured, the acceleration acting on a tread portion during rotation of the tire can be measured. In place of the acceleration sensor 2, an acceleration pickup using a piezoelectric element may be used, or an acceleration pickup of a distortion gauge type in which distortion gauges are combined may be used.

Figure 3A:
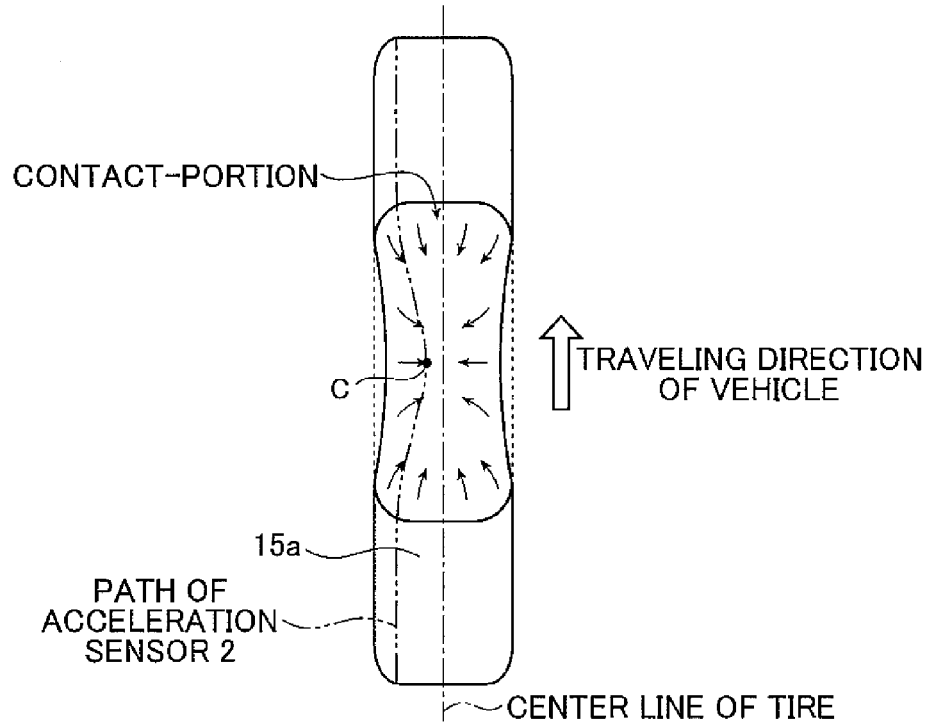

In this embodiment, the acceleration sensor 2 is placed on an inner surface of a shoulder portion of the tire 15 (see FIG. 3A). Generally, in the shoulder portion of the tire, belt ends of a plurality of belts stacked in the tire tread portion are positioned, and an internal mechanical failure such as a separation is likely to occur during production or traveling, compared with the other portions. By providing the acceleration sensor in the shoulder portion of the tire, an internal mechanical failure occurring in the tire can be detected relatively quickly. In the present invention, the number of acceleration sensors placed in each tire is not particularly limited. In the case where it is desired that an internal mechanical failure of each tire is detected with higher precision, a plurality of the acceleration sensors 2 are provided in a circumferential direction of the tire. More preferably, at least one acceleration sensor is placed at all times in the contact-portion of the tire while the vehicle provided with the tire is traveling on a road surface. It is preferable that a plurality of the acceleration sensors 2 are provided in a tire width direction. It should be noted that, even in the case where one acceleration sensor is placed in each tire as in this embodiment, an internal mechanical failure occurring in each tire can be detected with more sufficient precision, compared with the conventional example. In this context, the tire radial direction means, a direction along a perpendicular line dropped from a position of the tire where the acceleration sensor 2 is placed to the rotation center axis of the tire 15, when the tire 15 is filled with air so that the tire 15 achieves a predetermined air pressure, and the tire 15 is kept out of contact. The tire width direction means a direction that is perpendicular to the tire radial direction, and parallel to a plane (the meridian plane of the tire 15) including the rotation center axis of the tire 15, which passes the position of the tire where the acceleration sensor 2 is placed. The tire circumferential direction means, a direction perpendicular to either of the tire radial direction and tire width direction.

The data processing unit 20 includes a receiver 3, an amplifier (AMP) 4, a processing mechanism 21, a CPU 23, and a memory 27. The data processing unit 20 is a computer in which each portion shown in the processing mechanism 21 functions when the CPU 23 executes a program stored in the memory 27.

The processing mechanism 21 is composed of a data acquiring part 22, a processing part 24, a deriving part 26, a calculating part 28, and a determining part 30. The data acquiring part 22 acquires measurement data of an acceleration in a tire radial direction (R-direction measurement data), an acceleration in a tire circumferential direction (C-direction measurement data), and an acceleration in a tire width direction (W-direction measurement data) of a predetermined portion (setting position of the acceleration sensor 2) of a tread portion of the tires 15a to 15d constituting the wheels 14a to 14d, respectively. The processing part 24 subjects the R-direction measurement data, the C-direction measurement data, and the W-direction measurement data to signal processing, thereby extracting the R-direction deformation acceleration data of each tire, the C-direction deformation acceleration data of each tire, and the W-direction deformation acceleration data. Further, the processing part 24 obtains a ground-contact timing of the predetermined portion of the tire 15 from the extracted R-direction deformation acceleration data. Then, the deriving part 26 derives deformation amounts (data) in two directions, that is, the C-direction deformation amount data and the W-direction deformation amount data, of the above-mentioned predetermined portion in each contact-portion of the tires 15a to 15d from the above-mentioned deformation acceleration data (deformation acceleration data in a circumferential direction and deformation acceleration data in a width direction), using the ground-contact timing. The calculating part 28 calculates an evaluation value for evaluating the presence/absence of the occurrence of an internal mechanical failure of each tire, based on the derived deformation amounts in two directions. The determining part 30 compares a reference value previously stored in the memory 27 with the above-mentioned calculated evaluation value, thereby determining whether or not an internal mechanical failure has occurred in each tire. The function of each means will be described later.

Figure 3B:
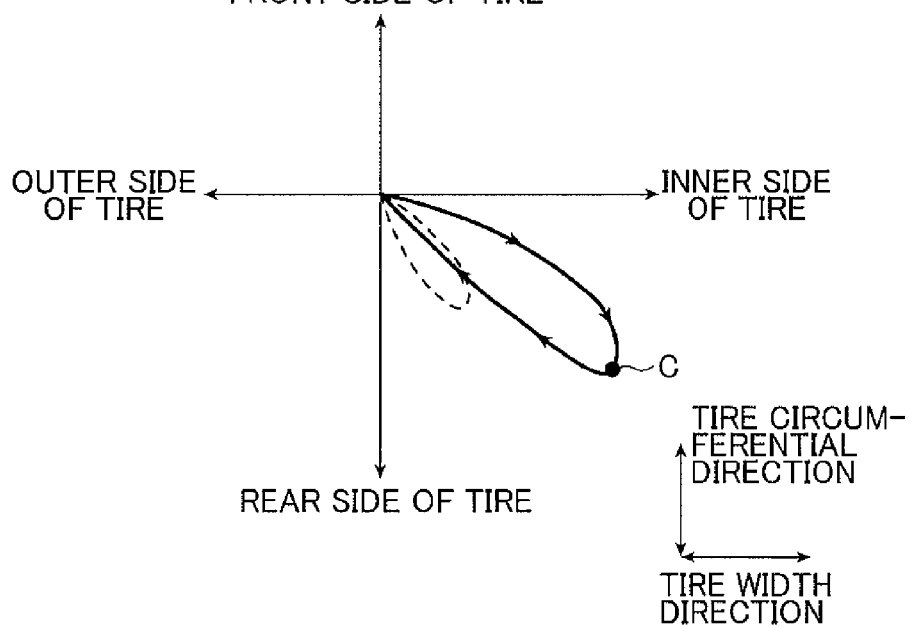

The present invention is characterized by obtaining the deformation amounts in two directions, that is, the deformation amount in a tire circumferential direction and the deformation amount in a tire width direction, of a predetermined portion of a tread portion in each tire contact-portion of the tires 15a to 15d, and calculating an evaluation value for determining the presence/absence of the occurrence of an internal mechanical failure of the tire based on the deformation amounts in two directions. According to the present invention, an internal mechanical failure occurring in each of the tires 15a to 15d mounted to the vehicle 12 can be detected easily with high precision even during traveling of the vehicle 12. FIGS. 3A and 3B illustrate a force applied to the contact-portion of the tires 15a to 15d during traveling of the vehicle 12. FIG. 3A is a schematic view illustrating a force applied to a tread portion of the tire and the deformation of the tread portion in each contact-portion of the tires 15a to 15d, in which one tire (tire 15a) of the vehicle 12 is seen from a road surface side.

As shown in FIG. 2, in the contact-portion of the tire, the tire having a cross-section in a substantially arc shape is pressed against the road surface in a flat shape. Therefore, as shown in FIG. 3A, the entire tread portion surface of the tire receives a force in such a manner as to be contracted to the center of the contact-portion. Then, the entire tread portion surface of the tire is deformed so as to be contracted toward the center of the contact-portion. In the contact-portion of the tire, the tread portion of the tire is deformed in such a manner, so that the acceleration sensor 2 mounted to the tire passes through a path as represented by a chain double-dashed line of FIG. 3A along with the progress of the vehicle. FIG. 3B is a graph showing the deformation amount in a time series in a tire circumferential direction and the deformation amount in a time series in a tire width direction of a predetermined portion (mounting position of the acceleration sensor 2) of the tread portion while the acceleration sensor 2 is passing through the contact-portion shown in FIG. 3A, and showing the deformation in a time series of a predetermined portion of the tire 15a by an orthogonal coordinate composed of a tire circumferential direction and a tire width direction. As shown in FIG. 3A and a solid line in the graph of FIG. 3B, the predetermined portion (mounting position of the acceleration sensor) of the tire 15a approaches the center of the contact-portion of the tire 15a when the predetermined portion is grounded, and then, the deformation amount increases with the progress (rotation of the tire 15) of the vehicle 12. When the acceleration sensor 2 passes over the vicinity of the center (represented by reference symbol C in FIGS. 3A and 3B), the deformation amount gradually decreases, and becomes substantially zero at an end of the contact-portion of the tire.

The degree and form of such a deformation (i.e., the balance between the magnitude of the deformation amount in a tire circumferential direction and the magnitude of the deformation amount in a tire width direction) varies depending upon the structure of the tire. More specifically, the magnitude of a force of the deformation applied to the tire surface (force applied in directions represented by the arrows of FIG.

3A) and the degree of a deformation of the tire surface (the magnitude of the deformation amount, the deformation occurs in the directions represented by the arrows of FIG. 3A) vary depending upon the surface structure and the internal structure of the tire. The inventors of the present application expected as follows. In a portion where a separation occurs, e.g., in the case where a separation occurs in a tire, the magnitude of a force (force applied in the directions represented by the arrows of FIG. 3A) of the deformation of the tire surface is unlikely to be transmitted, and the degree of the deformation becomes small. Further, the inventors of the present application expected as follows. The force of a deformation applied to a tire surface, the deformation of the tire surface, and the like also vary between a tire circumferential direction and a tire width direction depending upon the form of a separation, and for example, as shown in a broken line in the graph of FIG. 3B, the tire surface is deformed in a different manner from that in the case (shown in the solid line in the graph of FIG. 3B) where an internal mechanical failure such as a separation has not occurred in a tire. The processing mechanism 21 calculates an evaluation value representing the degree of a deformation and the form of the deformation of a tread portion of a tire in the contact-portion of the tire, and determines whether or not an internal mechanical failure has occurred in the tire based on the calculated evaluation value.

As described above, the processing mechanism 21 includes the data acquiring part 22, the processing part 24, the deriving part 26, the calculating part 28, and the determining part 30. The data acquiring part 22 acquires measurement data of an acceleration of at least one rotation of the tire, amplified by the amplifier 4, as input data. The data acquiring part 22 acquires time-series data on an acceleration in a tire radial direction (R-direction measurement data), time-series data on an acceleration in a tire circumferential direction (C-direction measurement data), and time-series data on an acceleration in a tire width direction (W-direction measurement data). The data supplied from the amplifier 4 is analog data, and the data acquiring part 22 samples each of the time-series data of an acceleration with a predetermined sampling frequency to convert them into each digital data. The data acquiring part 22 identifies the tire which is corresponding to the acquired measurement data transmitted from each transmitter 17 (determine which acceleration of a tire among the tires 15a to 15d), based on the above-mentioned ID Thereafter, each processing performed in each of the processing part 24, the deriving part 26, the calculating part 28, and the determining part 30 is performed in parallel with respect to each of the measurement data of the respective tires 15a to 15d.

The processing part 24 extracts time-series data of an acceleration data due to the deformation of a tire from the digitized R-direction measurement data, C-direction measurement data, and W-direction measurement data. Specifically, the processing part 24 performs smoothing processing with respect to the measurement data of an acceleration, calculates an approximated curve with respect to the smoothened signals to obtain a background component 1, and removes the background component 1 from the smoothened measurement data of an acceleration. Consequently, time-series data of an acceleration due to the deformation of a tire in a tire radial direction (r-direction deformation acceleration data), time-series data of an acceleration due to the deformation of a tire in a tire circumferential direction (C-direction deformation acceleration data), and time-series data of an acceleration due to the deformation of a tire in a tire width direction (W-direction deformation acceleration data), are extracted, respectively. The processing part 24 extracts a ground-contact timing (at which the acceleration sensor 2 mounted to an inner circumferential surface of a tire hollow region comes to (most approaches) a center position of the contact-portion of the tire) of a predetermined portion of the tire 15, i.e., a timing at which a rotation angle Φ shown in FIG. 2 becomes 180°, 540°, 900°, . . . from the R-direction deformation acceleration data. The extracted ground-contact timing of the predetermined portion of the tire 15, C-direction deformation acceleration data, and W-direction deformation acceleration data are sent to the deriving part 26. The specific processing carried out in the processing part 24 will be described later.

The deriving part 26 performs a second-order time integration respectively with respect to the extracted C-direction deformation acceleration data and W-direction deformation acceleration data, and calculates time-series data on the deformation amount in a tire circumferential direction (C-direction deformation amount data) and time-series data on the deformation amount in a tire width direction (W-direction deformation amount data). Specifically, the deriving part 26 performs a second-order time integration with respect to the C-direction deformation acceleration data and the W-direction deformation acceleration data. After that, an approximated curve is calculated with respect to each data obtained by the second-order time integration, using the ground-contact timing of the predetermined portion of the tire 15 extracted in the processing part 24, whereby each background component 2 is obtained. The respective background components 2 are removed from the displacement data obtained by the second-order time integration, whereby time-series data on the deformation amount in a tire circumferential direction (C-direction deformation amount data), and time-series data on the deformation amount in a tire width direction (W-direction deformation amount data), are calculated, respectively. The specific processing in the deriving part 26 will be described in detail later. Then, the calculated C-direction deformation amount data and W-direction deformation amount data are outputted to the calculating part 28.

The calculating part 28 calculates an evaluation value for determining whether or not an internal mechanical failure has occurred in a tire, based on the C-direction deformation amount data and the W-direction deformation amount data. As described above, in the case where an internal mechanical failure such as a separation occurs in a tire, the degree of a deformation of a tire surface and the form of the deformation vary, compared with the case where such an internal mechanical failure has not occurred in the tire. As shown in FIG. 3B, the degree of a deformation of a tire surface and the form of the deformation can be represented by using the C-direction deformation amount data and the W-direction deformation amount data. The calculating part 28 calculates an evaluation value for characterizing the degree of a deformation of a tire surface and the form of the deformation, using the C-direction deformation amount data and the W-direction deformation amount data.

Figure 4:
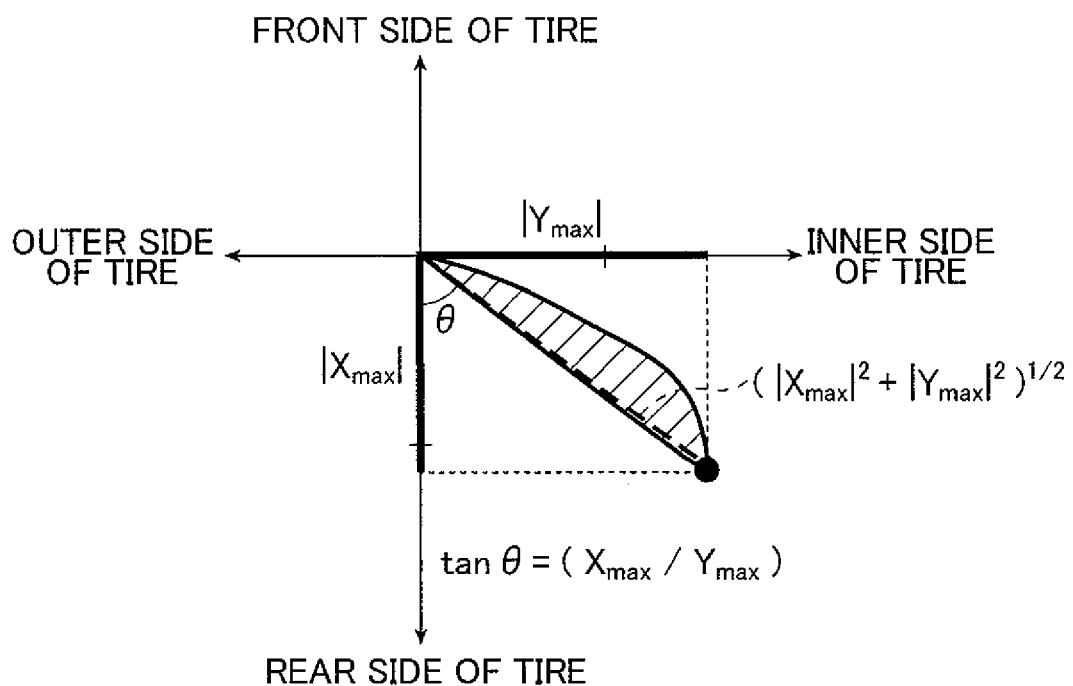
FIG. 4 is a graph illustrating an example of an evaluation value in the present invention.

FIG. 4 is a diagram illustrating an example of an evaluation value in the present invention. The calculating part 28 first extracts a maximum value $X_{max}$ of a circumferential direction (C-direction) deformation amount of a predetermined portion of a tire from C-direction deformation amount data. Similarly, the calculating part 28 also extracts a maximum value $Y_{max}$ of a width direction (W-direction) deformation amount of the predetermined portion of the tire from W-direction deformation amount data. As described above, usually, the C-direction deformation amount and the W-direction deformation amount of the predetermined portion become maximum at a timing when the predetermined portion most approaches the center of the contact-portion. In this embodiment, the calculating part 28 uses the maximum value $X_{max}$ and the maximum value $Y_{max}$, for example, an evaluation value $\theta$ represented by a formula $\theta = \tan^{-1}(X_{max}/Y_{max})$. Such an evaluation value $\theta$ can be considered as a value for characterizing the form of the deformation of a tire surface in the contact-portion of the tire.

It should be noted that in the calculating part 28, for example, a value represented by a formula $X_{max} \times Y_{max}$ may be set to be an evaluation value, and a value represented by a formula $(X_{max}^2 + Y_{max}^2)^{1/2}$ may be set to be an evaluation value. Further, the size of an area of a shaded area of FIG. 4 may be set to be an evaluation value. Further, for example, only $X_{max}$ may be used as an evaluation value, or only $Y_{max}$ may be used as an evaluation value. The evaluation value thus obtained can be considered to be a value for characterizing the degree of the deformation of a tire surface in a contact-portion of the tire. In the present invention, it is more preferable to use the evaluation value $\theta$ for characterizing the form of the deformation of a tire surface in a contact-portion of the tire, represented by the formula $\theta = \tan^{-1}(X_{max}/Y_{max})$ as an evaluation value. The reason for this is as follows. The degree of the deformation (magnitude of a deformation amount) in a tire contact-portion changes in accordance with traveling state on a road surface condition and a vehicle condition (load, etc.), so that an evaluation value representing only the degree of the deformation (only the magnitude of the deformation) of a tire surface includes a relatively large number of fluctuation components based on such traveling conditions as noises. By using the $\theta$ for characterizing the form of the deformation of a tire surface as an evaluation value, the presence/absence of the occurrence of an internal mechanical failure of a tire can be determined with higher precision without being influenced by such fluctuation components. It is also preferable to use an evaluation value $\theta'$ represented by a formula $\theta' = \tan^{-1}(Y_{max}/X_{max})$ as an evaluation value.

Further, for example, an evaluation value may be obtained, using a normalized deformation amount maximum value $X_{max}^*$ and a normalized deformation amount maximum value $Y_{max}^*$ obtained by normalizing the maximum value $X_{max}$ and the maximum value $Y_{max}$, using the respective predetermined values. For example, in the case where the maximum value $X_{max}$ ($X_{max}$ at a normal time) and the maximum value $Y_{max}$ ($Y_{max}$ at a normal time) when a normal tire without an internal mechanical failure of the same specification (same size and air pressure) as that of a tire to be determined for an internal mechanical failure is mounted to the same vehicle, are previously known, normalization may be performed by using those values ($X_{max}$ at a normal time $Y_{max}$ at a normal time) In the case where the above-mentioned $X_{max}$ at a normal time and the above-mentioned $Y_{max}$ at a normal time are previously known for a plurality of traveling conditions, normalization may be performed using the $X_{max}$ at a normal time and $Y_{max}$ at a normal time corresponding to each traveling condition, in accordance with the traveling conditions of the vehicle. For example, an evaluation value may be obtained from a formula $X_{max}^* \times Y_{max}^*$ or a formula $(X_{max}^{*2} + Y_{max}^{*2})^{1/2}$, using the normalized deformation amount maximum value $X_{max}^*$ and the normalized deformation amount maximum value $Y_{max}^*$. Further, the size of an area corresponding to the shaded region of FIG. 4 may be set to be an evaluation value.

Further, for example, a calculated value of formula such as $X_{max} \times Y_{max}(X_{max}^2 + Y_{max}^2)^{1/2}$, $X_{max}/Y_{max}$, or $Y_{max}/X_{max}$ is obtained using the maximum value $X_{max}$ and the maximum value $Y_{max}$, the calculated value is normalized by a similar calculated value using the above-mentioned $X_{max}$ at a normal time and the above-mentioned $Y_{max}$ at a normal time, and the resultant value may be used as an evaluation value. For example, a value obtained by calculating the formula $X_{max} \times Y_{max}$ using the maximum value $X_{max}$ and the maximum value $Y_{max}$, and normalizing the value obtained from the formula $X_{max} \times Y_{max}$ using the value of $X_{max}$ (at a normal time) $\times Y_{max}$ (at a normal time). Thus, by performing normalization using the deformation amount in the case of using a normal tire without an internal mechanical failure, the influence by fluctuation components based on traveling conditions can be reduced. Accordingly, the presence/absence of the occurrence of an internal mechanical failure of a tire can be determined with higher precision without being influence by such fluctuation components. The evaluation value (evaluation value $\theta$ in this embodiment) calculated in the calculating part 28 is sent to the determining part 30. $X_{max}$ at a normal time and $Y_{max}$ at a normal time may be previously stored in a memory (storage means) of an internal mechanical failure detection apparatus.

The determining part 30 determines whether or not an internal mechanical failure has occurred in the tire 15 by comparing the calculated evaluation value $\theta$ with a previously determined reference value. The reference value is previously stored in the memory 27 by input means (not shown), and is read by the determining part 30. Regarding such a reference value, for example, when the tire 15 is mounted to a vehicle, an attachment operator may store a numerical value suitable for the tire 15 in the memory 27. Further, during production or shipping of the apparatus 10 and the vehicle 12, or during attachment of the apparatus 10 to the vehicle 12, a reference value in accordance with the specification of a vehicle and a tire may be set. In the case where a tire which is known to have no internal mechanical failure is mounted to a vehicle, only a failure occurring during traveling of the vehicle becomes a problem. In such a case, every time the traveling of the vehicle is started, an evaluation value obtained initially at a commencement of traveling may be stored as a reference value. For example, an evaluation value obtained initially after the traveling speed of the vehicle achieves a predetermined value may be stored as a reference value.

As the reference value, for example, an evaluation value in the case of a normal tire without an internal mechanical failure of the same specification (same size and air pressure) as that of a tire to be determined for an internal mechanical failure is mounted to the same vehicle, or a predetermined value derived based on such an evaluation value may be used. For example, as the reference value, an upper limit value and a lower limit value of the evaluation value $\theta$ derived in the case where a normal tire without an internal mechanical failure is mounted may be previously stored, or either the upper limit value of the evaluation value $\theta$ or the lower limit value of the evaluation value $\theta$ may be stored. The determining part 30 may determine that an internal mechanical failure has occurred in the tire 15 in the case where the evaluation value calculated in the calculating part 28 is out of the range of an evaluation value in a normal tire previously stored as the reference value.

Alternatively, as the reference value, for example, an evaluation value in the case where a tire with an internal mechanical failure of the same specification (same size and air pressure) as that of a tire to be determined for an internal mechanical failure is mounted to the same vehicle, or a predetermined value derived based on such an evaluation value may be used. In this case, the determining part 30 determines that an internal mechanical failure has occurred in the tire 15 in the case where the evaluation value calculated in the calculating part 28 is in a range of the evaluation value in the tire with an internal mechanical failure previously stored as a reference value. Further, for example, a value obtained by normalizing an evaluation value in the case of mounting a tire with an internal mechanical failure by an evaluation value in the case of mounting a normal tire without an internal mechanical failure to the same vehicle, or a predetermined value derived based on such a normalized evaluation value may be used as the reference value.

In this embodiment, for example, as the reference value, an upper limit value or a lower limit value of the evaluation value θ in the case of mounting a tire with an internal mechanical failure may be previously stored, or either the upper limit value or the lower limit value of the evaluation value θ may be stored.

The determining part 30 sends determination results to the display 34 every time the determination is performed. The display 34 displays such determination results. The display 34 can successively display various kinds of data and calculation results dealt in the processing mechanism 21, such as the waveform of the acquired acceleration data and calculated various kinds of parameters. The display 34 displays a warning for informing a driver of the vehicle 12 of the occurrence of an internal mechanical failure in the case where it is determined that an internal mechanical failure has occurred in the tire 15 in the determining part 30. It is more preferable that the apparatus 10 has warning generation means with sound for informing the driver of the vehicle 12 of the occurrence of an internal mechanical failure, in addition to the display 34.

Figure 5:
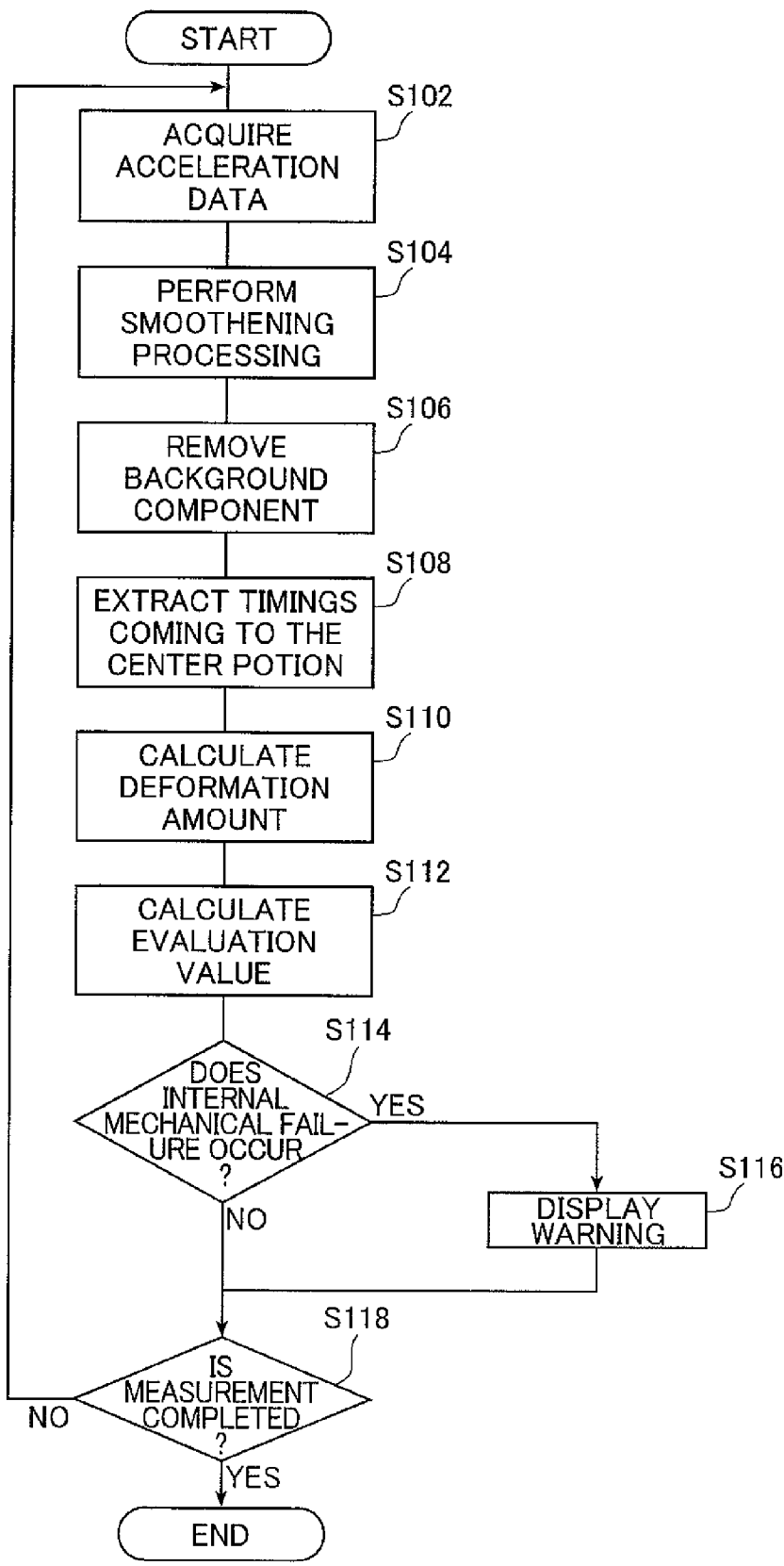
FIG. 5 is a flowchart illustrating a tire internal mechanical failure detection method according to this embodiment of the present invention.

FIG. 5 is a flowchart of the tire internal mechanical failure detection method of the present invention performed in the apparatus 10. FIGS. 6A to 6C and FIGS. 7A to 7C each show an example of the results obtained in each processing in the apparatus 10. The results shown in FIGS. 6A to 6C and FIGS. 7A to 7C are processing results regarding the tire radial direction acceleration data measured by the acceleration sensor 2. Hereinafter, the tire internal mechanical failure detection method of the present invention performed in the apparatus 10 will be described in detail, with the tire radial direction acceleration data being an example.

Figure 6A:
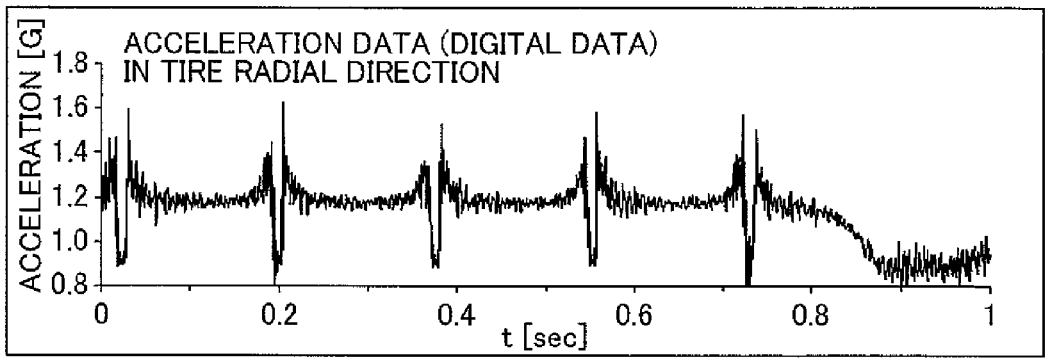
FIGS. 6A to 6C are diagrams showing an example of the results obtained by the processing in a processing part of the data processing unit shown in FIG. 2.

First, measurement data of an acceleration of each tire, amplified by the amplifier 4, is supplied to the data acquiring part 22. Then, in the data acquiring part 22, the measurement data is sampled with a predetermined sampling frequency, whereby digitized measurement data as shown in FIG. 6A is acquired (Step S102). At this time, the data acquiring part 22 determines which tire the measurement data of an acceleration sent from each wheel corresponds to, based on the above-mentioned ID sent from each transmitter 17, as described above. The subsequent processing is performed respectively for each measurement data of an acceleration of each tire.

Figure 6B:
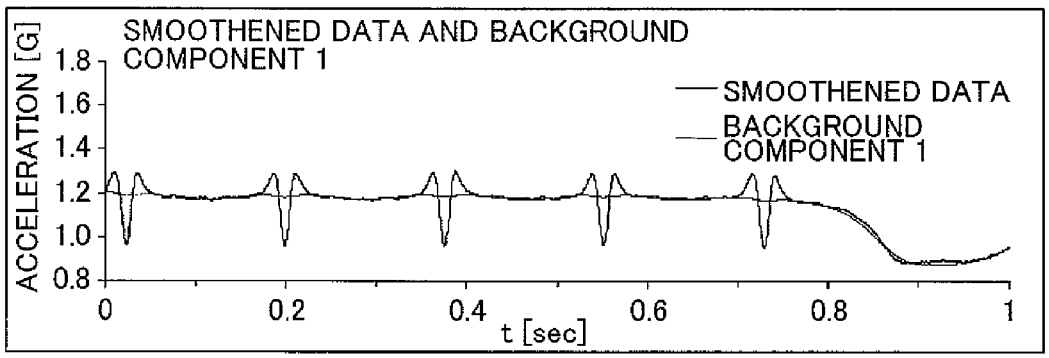

Next, the acquired measurement data is supplied to the processing part 24 and is subjected to smoothing processing by a filter (Step S104). As shown in FIG. 6A, the measurement data supplied to the processing part 24 contains a large amount of noise components, so that it is made smooth data as shown in FIG. 6B by the smoothening processing. As the filter, for example, a digital filter with a predetermined frequency being a cut-off frequency is used. The cut-off frequency is set depending upon the rotating speed and noise components. For example, in the case of a rotating speed of 60 (km/hour), the cut-off frequency is set to be 0.5 to 2 (kHz). The smoothening processing may be performed, using moving average processing, a trend model, or the like.

Figure 6C:
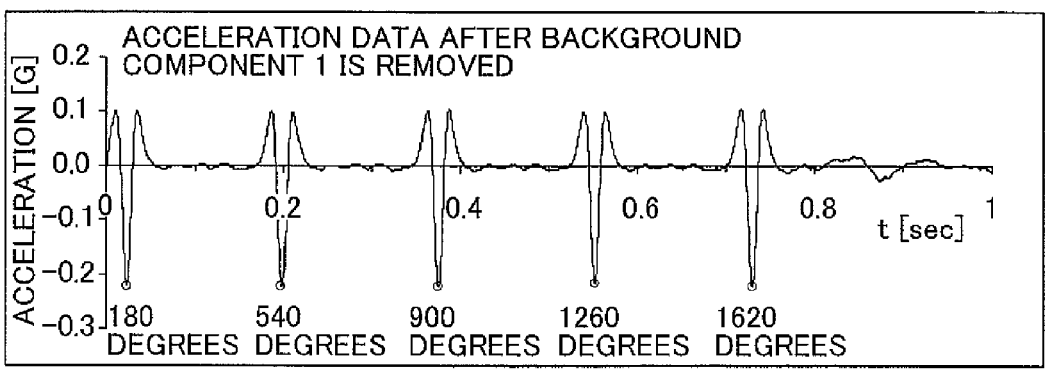

Next, in the processing part 24, a background component 1 of a low frequency is removed from the smoothened measurement data of an acceleration (Step S106). The background component 1 of an acceleration of a tire includes the influence of a centrifugal acceleration component and a gravity acceleration component during rotation of a tire. In FIG. 6B, the waveform of the background component 1 is shown. The extraction of a low-frequency component is performed by further smoothening the waveform data after smoothening processing obtained in Step S104. For example, a digital filter using a predetermined frequency as a cut-off frequency is used. For example, in the case where a rotating speed is 60 (km/hour) the cut-off frequency is set to be 0.5 to 2 (kHz). Instead of the digital filter, moving average processing or the smoothing processing using a trend model or the like may be performed. Further, the following may also be performed. A plurality of nodal points are provided at a predetermined time interval in waveform data after smoothening processing, a first approximation curve of these points is calculated by least-squares method, using a predetermined function type (e.g., a tertiary spline function). The nodal point means a constraint condition on a horizontal axis defining a local curvature (flexibility) of the spline function. In the processing part 24, by subtracting the background component 1 thus extracted from the measurement data of an acceleration smoothened in Step S104, an acceleration component and a gravity acceleration component based on the rotation of a tire is removed from the measurement data. FIG. 6C shows time-series data of an acceleration after removal. Thus, an acceleration component due to the ground-contact deformation of a tread portion of a tire (time-series data of an acceleration due to the deformation of a tire) can be extracted.

The processing part 24 extracts timings at which the rotation angle Φ shown in FIG. 2 becomes 180°, 540°, 900°, . . . from the time-series data of an acceleration due to the deformation of a tire thus (Step S108). In the processing part 24, in a graph of time-series data of an acceleration due to the deformation of a tire, timings at which the acceleration due to the deformation of a tire become local minimum values are extracted as timings at which the rotation angle Φ becomes 180°, 540°, 900°, . . . . More specifically, the timings of the local minimum values are extracted as timings at which the acceleration sensor 2 mounted to an inner circumferential surface of a hollow region of a tire comes to (most approaches) the center position of the contact-portion of the tire, as shown in FIG. 2. In the contact-portion of the tire, the position in the direction vertical to the road surface of the outer circumferential surface of the tire is defined by the road surface. In the contact-portion, the road surface deforms the tire outer circumferential surface that originally has a curvature in a flat shape, so that the tire is deformed in the thickness direction. Consequently, the position of the inner circumferential surface of the tire hollow region changes largely in the tire thickness direction (direction vertical to the road surface) in the contact-portion. The deformation in the tire thickness direction becomes a minimum at the center of the contact-portion. The timings, at which the acceleration in the tire radial direction due to the deformation of the tire becomes a local minimum, obtained by the acceleration sensor mounted to the inner circumferential surface of the tire hollow region can be considered as those at which the above-mentioned rotation angle Φ becomes 180°, 540°, 900° . . . . The timings at which the above-mentioned rotation angle Φ becomes 180°, 540°, 900°, . . . can also be derived, even using either the deformation acceleration in a tire circumferential direction and the deformation acceleration in a tire width direction. Each processing from Step S104 to Step S108 is performed with respect to the measurement data of an acceleration of each of the wheels 14a to 14d obtained in Step S102.

Figure 7A:
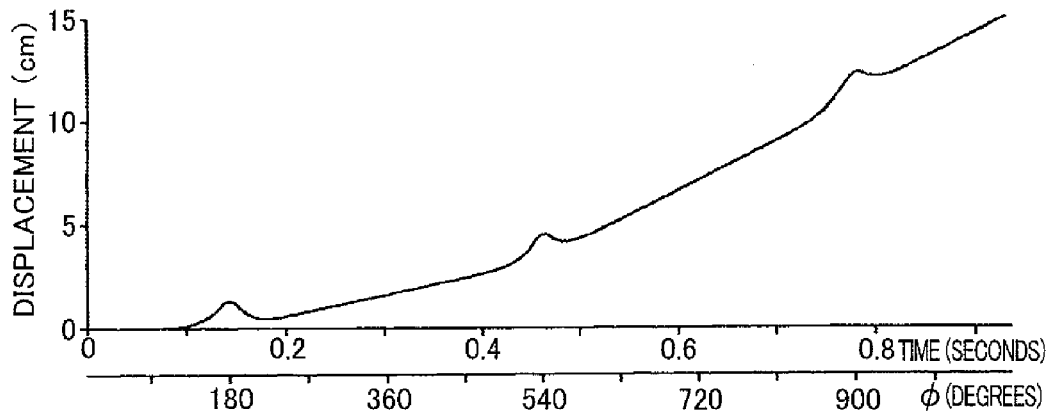
FIGS. 7A to 7C are diagrams showing an example of the results obtained by the processing in a deriving part of the data processing unit shown in FIG. 2.
Figure 7B:
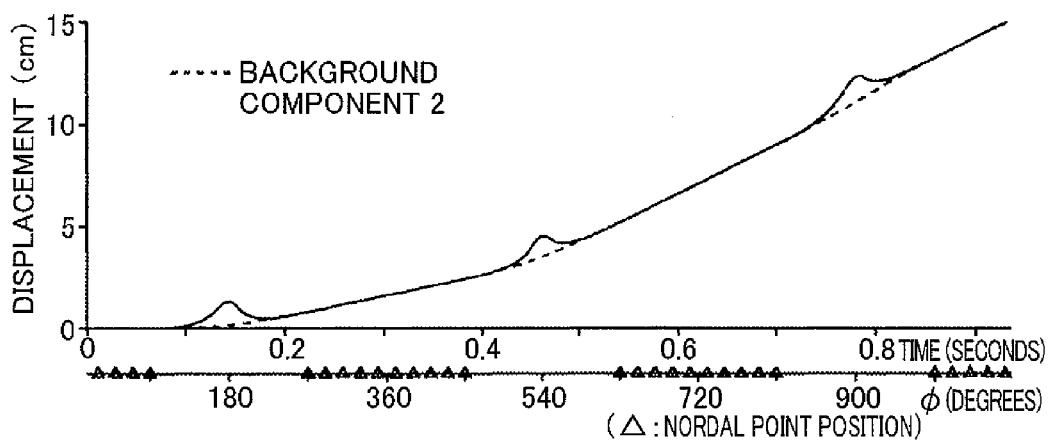
Figure 7C:
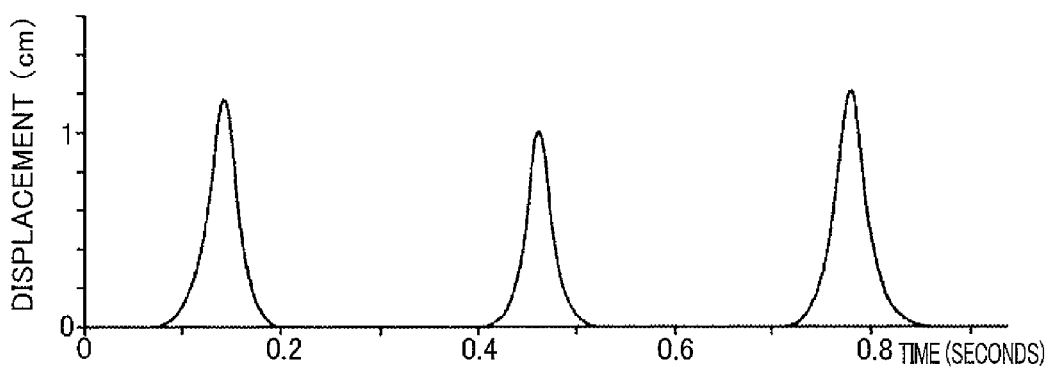

Next, using the processing results in the processing part 24, in the deriving part 26, C-direction deformation amount data and W-direction deformation amount data of each of the tires 15a to 15d of the vehicle 12 during traveling is derived (Step S110). FIGS. 7A to 7C are graphs schematically showing the results of the processing performed in the deriving part 26 in Step S110. The deriving part 26 first performs a second-order time integration with respect to time-series data of an acceleration due to the ground-contact deformation, thereby generating displacement data. FIG. 7A shows the results obtained by performing a second-order time integration with respect to the time-series data of an acceleration from which the first background component is removed in the data processing part. As shown in FIG. 7A, it can be seen that a displacement increases with the elapse of time. The reason for this is that the time-series data of an acceleration to be accumulated contains a noise component, and the noise component is also accumulated by the accumulation. In general, in the case of observing the deformation amount or the displacement of a point to be observed of the tread portion of the rotating tire in a stationary state, a periodical change is exhibited with the rotation period of the tire being a unit. Thus, generally, the displacement cannot only increase with the elapse of time. Then, the following processing is performed with respect to the displacement data so that the displacement data obtained by a second-order time integration exhibits a periodical change with the rotation period of the tire being a unit.

More specifically, in the same way as in the method for calculating the background component 1, a noise component contained in the displacement data is calculated as the background component 2. At this time, by using a time-series rotation angle obtained in the above-mentioned centrifugal derivation, the deformation amount of the rotating tire in a region including the contact-portion with respect to the road surface can be obtained with high precision. More specifically, the region on the circumference of the tire is divided into a first region including the contact-portion with respect to the road surface and a remaining second region. For example, a region including Φ in a range of larger than 90° and less than 270°, larger than 4500 and less than 630°, and larger than 810° and less than 980 is obtained as the first region. And for example, a region including Φ in a range of 0° to 90°, 270° to 360°, 360° to 450°, 630° to 720°, and 720° to 810°, and 980° to 1070° is obtained as the second region. The background component 2 is obtained by using a plurality of circumferential positions (Φ or a time corresponding to Φ) in the second region as nodal points, and calculating a second approximation curve by a least-squares method with respect to the data in the first region and the second region, using previously determined function types. The nodal point means a constraint condition on a horizontal axis defining a local curvature (flexibility) of the spline function. In FIG. 7B, the second approximation curve that represents the background component 2 is represented by a dotted line. In the example shown in FIG. 7B, the positions represented by triangles of FIG. 7B, i.e., the times at the respective angles Φ are 10, 30, 50, 70, 90, 270, 290, 310, 330, 350, 370, 390, 410, 430, 450, 630, 650, 670, 690, 710, 730, 750, 770, 790, 810, 990, 1010, 1030, 1050, and 1070 are set to be the nodal points.

By performing a function approximation with respect to the displacement data shown in FIG. 7A with the tertiary spline function passing through the data points of the above-mentioned nodal points, a second approximation curve represented by a dotted line of FIG. 7B is calculated. In this embodiment, when the function approximation is performed, there are no nodal points in the first region, and only the plurality of nodal points in the second region are used. In addition, a weight coefficient of the second region used by the least-squares method performed for the function approximation is set to be 1, and a weight coefficient of the first region is set to be 0.01. The reason why the first weight coefficient is set to be small and nodal points are not determined in the first region when the background component 2 is calculated is that the background component 2 is calculated mainly using the displacement data in the second region. In the second region, the deformation due to the ground-contact of the tread portion is small, and the deformation thereof changes smoothly on the circumference, so that the deformation amount of the tire is small on the circumference, and the change thereof is very small. In contrast, in the first region, the tread portion of the tire is displaced largely due to the ground-contact deformation, and changes abruptly. Therefore, the deformation amount due to the ground-contact deformation is large on the circumference and changes abruptly. More specifically, the deformation amount of the tread portion in the second region is substantially constant, compared with the first deformation amount. Thus, by calculating the second approximation curve mainly using the displacement data obtained by the second-order time integration of the second region, the deformation amount of the rotating tire in the first region including the contact-portion with respect to the road surface, as well as in the second region can be obtained with high precision. FIG. 7B shows the second approximation curve calculated mainly using the displacement data of the second region by a dotted line. In the second region, the second approximation curve is substantially matched with the displacement data (solid line).

Then, the approximation curve calculated as the background component 2 is subtracted from the displacement data, and the distribution on the circumference of the deformation amount due to the ground-contact deformation of the tread portion is calculated. FIG. 7C shows the distribution of the deformation amount due to the ground-contact deformation of the tread portion calculated by subtracting the second approximation curve (dotted line) from the displacement data (solid line) shown in FIG. 7B. FIG. 7C shows the distribution of the deformation amount of three rotations (three ground-contacts) when a predetermined measurement position on the tread portion is displaced by rotating on the circumference. It is understood that the displacement amount changes for every ground-contact. The deformation amount calculated by such a method matches the deformation amount when simulation is performed using a finite element model of the tire with high precision. In the deriving part 26, such processing is performed with respect to each of the C-direction deformation acceleration data and the W-direction deformation acceleration data, whereby C-direction deformation amount data and W-direction deformation amount data are obtained respectively.

Next, in the calculating part 28, an evaluation value is calculated (Step S112). In the calculating part 28, a maximum value $X_{max}$ is extracted from the C-direction deformation amount data, and similarly, a maximum value $Y_{max}$ is extracted from the W-direction deformation amount data. Then, for example, an evaluation value θ represented by the formula $\theta = \tan^{-1}(X_{max}/Y_{max})$ is obtained.

Then, the determining part 30 compares the evaluation value θ calculated in the calculating part 28 with a reference value previously stored in the memory 27, thereby determining whether or not an internal mechanical failure has occurred in each tire (Step S114). In Step S114, in the case where there is a tire that is determined to have an internal mechanical failure, the display 34 displays a warning informing a driver driving the vehicle 12 of the presence of the tire in which the internal mechanical failure has occurred. At this time, it is preferable to display a warning in a form in which the driver can determine which tire among the tires 15a to 15d has an internal mechanical failure. In the determining part 30, in the case where it is determined that there is no tire in which an internal mechanical failure has occurred, such a warning is not displayed. A series of processes shown in Steps S102 to S116 are repeatedly performed until the driver gives an instruction of completing the measurement, until the traveling of the vehicle 12 is stopped, or until the determination in Step S118 becomes YES, for example. The tire internal mechanical failure detection method of the present invention is performed in this manner.

FIGS. 8A to 8D are diagrams illustrating the effects of the tire internal mechanical failure detection method of the present invention. Each graph shown in FIGS. 8A to 8D relates to two tires, that is, a tire A in which a tire internal mechanical failure such as a separation has not occurred, and a tire B of the same specification as that of the tire A, in which a separation occurs in a part of a shoulder. More specifically, each graph shown in FIGS. 8A to 8D shows the above-mentioned C-direction deformation amount data and the above-mentioned W-direction deformation amount data of a predetermined portion (mounting portion of the acceleration sensor) on each surface of the tires A and B, obtained by mounting the acceleration sensor to an inner surface of each shoulder portion of the tires A and B. The data shown in FIGS. 5A to 8D are obtained by rotating the tires A and B with a known indoor durability test using drum-type durability test apparatus (drum diameter: 2500 mm) under various conditions. The tires A and B had a tire size 195/65R15, and a filled air pressure of 200 kPa. In the shoulder portion of the tire B, by devising the production of the tire B, a separation between a belt member and a rubber member was generated over a region of 4 mm in the tire width direction and 120 mm in the tire circumferential direction. In the tire B, an acceleration sensor was set in the vicinity of the separation portion, and in the tire A, at the position corresponding to the acceleration sensor setting position in the tire B, an acceleration sensor is set.

Figure 8A:
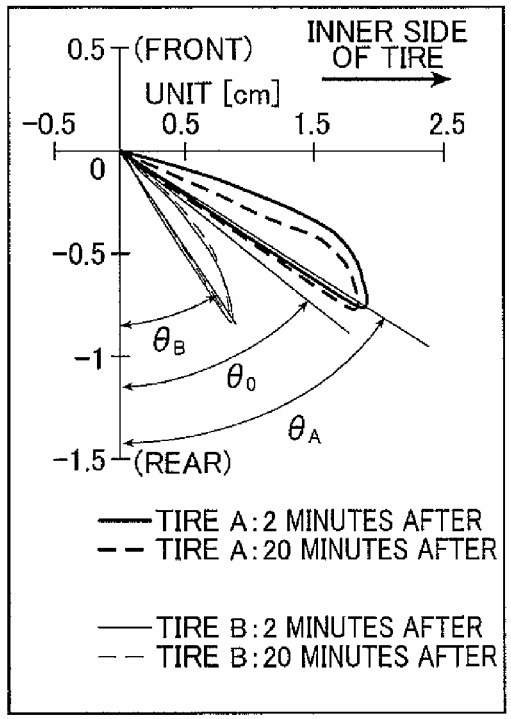
FIGS. 8A to 8D are diagrams illustrating the effects of the tire internal mechanical failure detection method of the present invention, showing circumferential direction deformation amount data and width direction deformation amount data on predetermined portions of respective surfaces of a tire A and a tire B.

FIG. BA shows a fluctuation in each evaluation value $\theta$ of the tires A and B in accordance with a change in the traveling time of the vehicle. FIG. 8A shows the deformation amount data (C-direction deformation amount data and W-direction deformation amount data) at a time when 2 minutes have passed from the commencement of a durability test (commencement of the rotation of the tire as the tire surface contacts with the road surface) and the deformation amount data (C-direction deformation amount data and W-direction deformation amount data) at a time when 20 minutes have passed from the commencement of the durability test, respectively regarding the tires A and B. In the example shown in FIG. 8A, in any of the tires A and B, under any conditions (any passage time), the ground-contact load was set to be 4 kN, and the velocity during rotation was set to be 60 km/h. At a time when about two minutes have passed from the commencement of the traveling, the tire temperature has not increased enough, and the tire temperature has increased more at a time when 20 minutes have passed from the commencement of the traveling, compared with a time when 2 minutes have passed from the commencement of traveling.

As shown in FIG. 8A, although there was a large difference between the evaluation value $\theta_A$ (in FIG. 8A, only the value after the traveling of 2 minutes is shown) of the tire A and the evaluation value $\theta_B$ (in FIG. 8A, only the value after the traveling of 2 minutes is shown) of the tire B, even when an elapsed time from the commencement of the traveling changed, a remarkable change of the evaluation value (value $\theta_A$, value $\theta_B$) was not found in each tire. More specifically, compared with the difference in the deformation form between the tires A and B caused by the presence/absence of a separation of the tire, the difference in the deformation form between the tires A and B caused by the change in the tire temperature was small. For example, in the case where a lower limit value $\theta_0$ as shown in FIG. 8A is set as a reference value, even when the traveling time (i.e., the tire temperature) changes, the evaluation value of the normal tire A is always larger than $\theta_0$, and the evaluation value of the tire B in which a separation has occurred is always smaller than $\theta_0$.

Figure 8B:
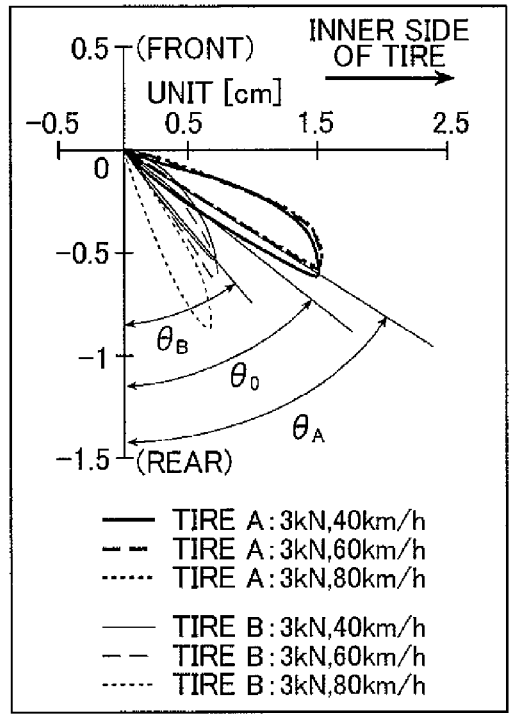
Figure 8C:
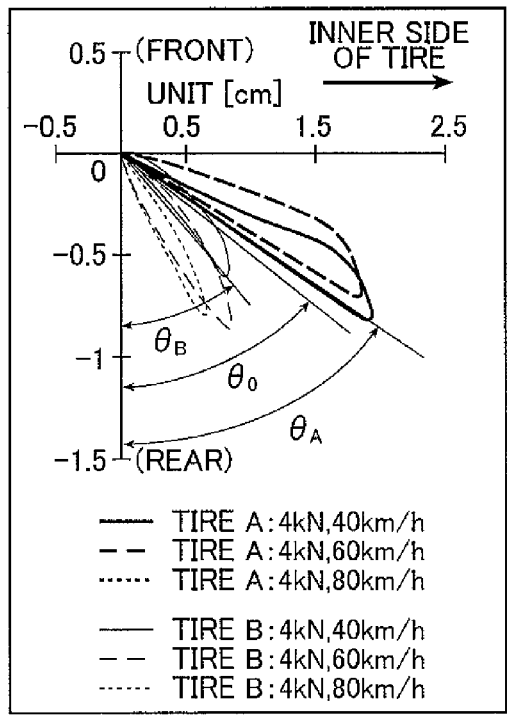

FIGS. 8B and 8C show a fluctuation in an evaluation value in accordance with the change in a rotating speed of the evaluation value $\theta$ of each of the tires A and B, and show the deformation amount data (C-direction deformation amount data and W-direction deformation amount data) in each rotating speed in the case where the rotating speed is changed to 40 km/h, 60 km/h, and 80 km/h, with respect to each of the tires A and B. In the example shown in FIG. 8B, under any conditions (any conditions of a rotating speed), the ground-contact load was set to be 3 kN for both the tires A and B. In the example shown in FIG. 5C, the ground-contact load was set to be 4 kN for both the tires A and B. As shown in FIGS. 8B and 8C, although there was a large difference between the evaluation value $\theta_A$ (in each of FIGS. 8B and 8C, only the case of the rotating speed of 40 km/h is shown) of the tire A and the evaluation value $\theta_B$ (in each of FIGS. 8B and 8C, only the case of the rotating speed of 40 km/h is shown) of the tire B, even when only the rotating speed changed, a remarkable change in the tire deformation amount was not found in each tire. More specifically, compared with the difference in the deformation form between the tires A and B caused by the presence/absence of a separation of the tire, the difference in the deformation form between the tires A and B caused by the change in the tire rotating speed was small. For example, in the case where a lower limit value $\theta_0$ of the evaluation value $\theta$ as shown in each of FIGS. 5B and 8C is set as a reference value, even when the tire rotating speed changes, the evaluation value of the normal tire A is always larger than $\theta_0$, and the evaluation value of the tire B in which a separation has occurred is always smaller than $\theta_0$.

Figure 8D:
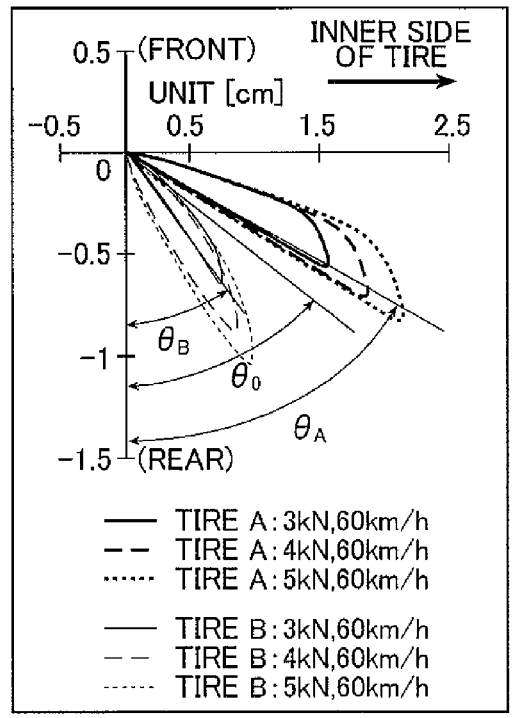

FIG. 8D shows the fluctuation in the evaluation value $\theta$ of each of the tires A and B in accordance with the change in a ground-contact load, and shows the deformation amount data (C-direction deformation amount data and W-direction deformation amount data) in each ground-contact load in the case where the ground-contact load is changed to 3 kN, 4 kN, and 5 kN, with respect to each of the tires A and B. In the example shown in FIG. 8D, even under any conditions (any conditions of a ground-contact load), the rotating speed was set to be 60 km/h in both the tires A and B. As shown in FIG. 8D, although there was a large difference between the evaluation value $\theta_A$ (in FIG. 8D, only the case of the ground-contact of 3 kN is shown) of the tire A and the evaluation value $\theta_B$ (in FIG. 8D, only the case of a ground-contact of 3 kN is shown) of the tire B, even when only the ground-contact load changed, a remarkable fluctuation was not found in the tire deformation value in each tire. More specifically, compared with the difference in the deformation form between the tires A and B caused by the presence/absence of a separation of the tire, the difference in the deformation form between the tires A and B caused by the change in the ground-contact load of the tire was small. For example, in the case where a lower limit value $\theta_0$ of the evaluation value $\theta$ as shown in FIG. 8D is set as a reference value, even when the tire ground-contact load changes, the evaluation value of the normal tire A is always larger than $\theta_0$, and the evaluation value of the tire B in which a separation has occurred is always smaller than $\theta_0$.

Thus, as shown in each graph of FIGS. 8A to 8D illustrating the results of an experiment performed using an indoor drum-type durability apparatus, even when the traveling conditions such as the temperature, rotating speed, ground-contact load, and the like of the tire change, the difference in the deformation form of the tire characterized by the evaluation value (for example, evaluation value θ) is relatively small. In contrast, the difference in the deformation form of the tire is relatively large between the case where an internal mechanical failure such as a separation has occurred and the case where an internal mechanical failure has not occurred in the tire. In the present invention, the presence/absence of the occurrence of an internal mechanical failure of the tire is determined based on the deformation form of the tire. Because of this, according to the present invention, the occurrence of an internal mechanical failure in a tire can be detected with high precision without the influence of a change in the traveling conditions such as the temperature, rotating speed, ground-contact load, and the like of the tire. It is assumed that the tire internal mechanical failure detection method and the tire internal mechanical failure detection apparatus of the present invention are used, with $\theta_0$ being set as a reference value, and an internal mechanical failure is determined to have occurred in the case where the evaluation value θ is below $\theta_0$. In this case, even in any of the cases shown in FIGS. 8A to 8D, exact detection results of an internal mechanical failure are obtained, in which the tire B is a tire with an internal mechanical failure and the tire A is a normal tire without an internal mechanical failure.

Further, Tables 1 and 2 show examples of an evaluation value under each traveling condition, which is obtained from the deformation amount data under each traveling condition shown in each graph of FIGS. 8A to 8D. In Tables 1 and 2, the C-direction deformation amount maximum value $X_{max}$ and the W-direction deformation amount maximum value $Y_{max}$ are substituted into each expression shown on the left side of Tables 1 and 2 to obtain each calculated value, and evaluation values are respectively calculated using each calculated value, with respect to the tires A and B. In Table 1, the above-mentioned calculated value of the tire A for each traveling condition is set to 100 (therefore, in Table 1, all the evaluation values of the tire A are 100), and a relative value obtained by normalizing the above-mentioned calculated value of the tire B for each traveling condition with the above-mentioned calculated value of the tire A under the corresponding traveling condition is used as the evaluation value of the tire B. Further, in Table 2, the above-mentioned calculated value of the tire A under one predetermined traveling condition (rotating speed: 60 km/h, ground-contact load: 4 kN, air pressure: 200 kPa) is set to 100. Then, relative values obtained by normalizing the above-mentioned calculated values of the tires A and B with the calculated value under the above-mentioned predetermined condition of the tire A are used as the respective evaluation values of the tires A and B. In Tables 1 and 2, the evaluation value represented by $\int(X_i*Y_i)$ refers to the value corresponding to the size of the shaded area of FIG. 4 (value obtained by accumulating the C-direction deformation amount and the W-direction deformation amount in terms of time).

TABLE 1

| | | ROTATING SPEED | | | | | | | |
|---|---|---|---|---|---|---|---|---|---|
| | | 40 km/h | | 60 km/h | | 80 km/h | | 40 km/h | |
| | | GROUND-CONTACT LOAD | | | | | | | |
| | | 3 kN | | 3 kN | | 3 kN | | 4 kN | |
| | | AIR PRESSURE | | | | | | | |
| | | 200 kPa | | 200 kPa | | 200 kPa | | 200 kPa | |
| | | TIRE | | | | | | | |
| | | TIRE B | TIRE A | TIRE B | TIRE A | TIRE B | TIRE A | TIRE B | TIRE A |
| EVALUATION VALUE | $X_{max}$ | 87 | 100 | 114 | 100 | 155 | 100 | 75 | 100 |
| | $Y_{max}$ | 46 | 100 | 47 | 100 | 44 | 100 | 43 | 100 |
| | $X_{max}*Y_{max}$ | 40 | 100 | 54 | 100 | 69 | 100 | 32 | 100 |
| | $(X_{max}^2+Y_{max}^2)^{1/2}$ | 54 | 100 | 59 | 100 | 68 | 100 | 49 | 100 |
| | $\int(X_i*Y_i)$ | 36 | 100 | 56 | 100 | 81 | 100 | 27 | 100 |
| | $Y_{max}/X_{max}$ | 53 | 100 | 41 | 100 | 29 | 100 | 58 | 100 |
| | $X_{max}/Y_{max}$ | 188 | 100 | 242 | 100 | 349 | 100 | 174 | 100 |

| | | ROTATING SPEED | | | | TIRE B | |
|---|---|---|---|---|---|---|---|
| | | 60 km/h | | 80 km/h | | MAXIMUM VALUE OF | MINIMUM VALUE OF |
| | | GROUND-CONTACT LOAD | | | | | |
| | | 4 kN | | 4 kN | | EVALUATION VALUE | EVALUATION VALUE |
| | | AIR PRESSURE | | | | | |
| | | 200 kPa | | 200 kPa | | UNDER EVERY | UNDER EVERY |
| | | TIRE | | | | CONDITION | CONDITION |
| | | TIRE B | TIRE A | TIRE B | TIRE A | | |
| EVALUATION VALUE | $X_{max}$ | 123 | 100 | 116 | 100 | 155 | 75 |
| | $Y_{max}$ | 46 | 100 | 36 | 100 | 47 | 36 |
| | $X_{max}*Y_{max}$ | 57 | 100 | 42 | 100 | 69 | 32 |
| | $(X_{max}^2+Y_{max}^2)^{1/2}$ | 62 | 100 | 54 | 100 | 68 | 49 |
| | $\int(X_i*Y_i)$ | 65 | 100 | 50 | 100 | 81 | 27 |
| | $Y_{max}/X_{max}$ | 37 | 100 | 31 | 100 | 58 | 29 |
| | $X_{max}/Y_{max}$ | 269 | 100 | 321 | 100 | 349 | 174 |

TABLE 2

| | | ROTATING SPEED | | | | | | | | | |
|---|---|---|---|---|---|---|---|---|---|---|---|
| | | 40 km/h | | 60 km/h | | 80 km/h | | 40 km/h | | 60 km/h | |
| | | GROUND-CONTACT LOAD | | | | | | | | | |
| | | 3 kN | | 3 kN | | 3 kN | | 4 kN | | 4 kN | |
| | | AIR PRESSURE | | | | | | | | | |
| | | 200 kPa | | 200 kPa | | 200 kPa | | 200 kPa | | 200 kPa | |
| | | TIRE | | | | | | | | | |
| | | TIRE B | TIRE A | TIRE B | TIRE A | TIRE B | TIRE A | TIRE B | TIRE A | TIRE B | TIRE A |
| EVALUATION VALUE | $X_{max}$ | 74 | 85 | 89 | 78 | 123 | 80 | 86 | 115 | 123 | 100 |
| | $Y_{max}$ | 38 | 82 | 39 | 83 | 37 | 84 | 45 | 104 | 46 | 100 |
| | $X_{max} * Y_{max}$ | 28 | 70 | 35 | 64 | 46 | 67 | 39 | 120 | 57 | 100 |
| | $(X_{max}^2 + Y_{max}^2)^{1/2}$ | 44 | 82 | 48 | 82 | 56 | 84 | 52 | 105 | 62 | 100 |
| | $\int (X_i * Y_i)$ | 27 | 75 | 36 | 65 | 56 | 69 | 36 | 133 | 65 | 100 |
| | $Y_{max}/X_{max}$ | 51 | 96 | 44 | 106 | 30 | 106 | 52 | 90 | 37 | 100 |
| | $X_{max}/Y_{max}$ | 195 | 104 | 227 | 94 | 330 | 95 | 193 | 111 | 269 | 100 |

| | | ROTATING SPEED 80 km/h | | TIRE B | | TIRE A | |
|---|---|---|---|---|---|---|---|
| | | GROUND-CONTACT LOAD 4 kN AIR PRESSURE 200 kPa TIRE | | MAXIMUM VALUE OF EVALUATION VALUE UNDER EVERY CONDITION | MINIMUM VALUE OF EVALUATION VALUE UNDER EVERY CONDITION | MAXIMUM VALUE OF EVALUATION VALUE UNDER EVERY CONDITION | MINIMUM VALUE OF EVALUATION VALUE UNDER EVERY CONDITION |
| | | TIRE B | TIRE A | | | | |
| EVALUATION VALUE | $X_{max}$ | 115 | 99 | 123 | 74 | 115 | 78 |
| | $Y_{max}$ | 36 | 99 | 46 | 36 | 104 | 82 |
| | $X_{max} * Y_{max}$ | 41 | 99 | 57 | 28 | 120 | 64 |
| | $(X_{max}^2 + Y_{max}^2)^{1/2}$ | 53 | 99 | 62 | 44 | 105 | 82 |
| | $\int (X_i * Y_i)$ | 50 | 99 | 65 | 27 | 133 | 65 |
| | $Y_{max}/X_{max}$ | 31 | 100 | 52 | 30 | 106 | 90 |
| | $X_{max}/Y_{max}$ | 321 | 100 | 330 | 193 | 111 | 94 |

The right end column of Table 1 shows the range of each evaluation value with respect to the tire B. Further, the right end column of Table 2 shows the range of each evaluation value with respect to the tires A and B respectively. In the case of comparing the ranges the respective evaluation values shown in Table 2 between the tires A and B, the probable range of the evaluation value varies between the tires A and B even when using any evaluation value, except for the case of using only the C-direction deformation amount as the evaluation value.

As is apparent from Tables 1 and 2, in the case where the relative value obtained by normalizing the calculated value of a tire as a target to be judged for an internal mechanical failure with the calculated value of a normal tire is used as the evaluation value, when the above-mentioned calculated value is $Y_{max}$ and the evaluation value of a tire as a target to be judged for an internal mechanical failure is 75 or less, more preferably 50 or less, if may be determined that an internal mechanical failure has occurred in the tire. Further, in the case where the above-mentioned calculated value is $X_{max} * Y_{max}$, when the evaluation value of a tire as a target to be judged for an internal mechanical failure is 60 or less, more preferably 45 or less, if may be determined that an internal mechanical failure has occurred in the tire. Further, in the case where the above-mentioned calculated value is $(X_{max} + Y_{max})^{1/2}$ when the evaluation value of a tire as a target to be judged for an internal mechanical failure is 75 or less, more preferably 55 or less, it may be determined that an internal mechanical failure has occurred in the tire. Further, in the case where the above-mentioned calculated value is $\int (X_i * Y_i)$, when the evaluation value of the tire as a target to be judged for an internal mechanical failure is 60 or less, more preferably 45 or less, it may be determined that an internal mechanical failure has occurred in the tire. Further, in the case where the above-mentioned calculated value is $X_{max}/Y_{max}$, when the evaluation value of a tire as a target to be judged for an internal mechanical failure is 130 or more, more preferably 150 or more, it may be determined that an internal mechanical failure has occurred in the tire. Further, in the case where the above-mentioned calculated value is $Y_{max}/X_{max}$, when the evaluation value of a tire as a target to be judged for an internal mechanical failure is 80 or less, more preferably 60 or less, it may be determined that an internal mechanical failure has occurred in the tire.

The tire internal mechanical failure detection apparatus and the tire internal mechanical failure detection method of the present invention have been described above in detail. However, the present invention is not limited to the above embodiment, and needless to say, may be variously altered or modified without departing from the gist of the present invention.

The invention claimed is:

1. An apparatus for detecting an internal mechanical failure of a tire that is attached to a wheel of a vehicle while the vehicle is traveling, including:

an information acquiring part for acquiring tire information on a predetermined portion of the tire at least in a tire radical direction and a tire width direction orthogonal to the tire radial direction during rotating while the vehicle is traveling, respectively;

a deriving part for deriving a deformation amount of a contact-portion of the tire at least in the tire width direction based on the tire information, the contact-portion being in contact with the ground;

a calculating part for calculating an evaluation value for determining a presence or absence of the internal mechanical failure based on the derived deformation amount of the tire at least in the tire width direction by the deriving part; and a determining part for comparing the calculated evaluation value by the calculating part with a predetermined reference value to determine whether or not the internal mechanical failure has occurred in the tire.

2. The apparatus according to claim 1, wherein the information acquiring part acquires acceleration data of the predetermined portion of the tire in time series in the tire radical direction and the tire with direction as the tire information, said acceleration data generated when the tire receives an external force from a road surface during rotating while the vehicle is traveling, and wherein the deriving part obtains the deformation amount of the contact-portion in the tire width direction by using the acceleration data of the tire in time series in the tire radial direction and the tire width direction acquired in the information acquiring part, respectively.

3. An apparatus for detecting an internal mechanical failure of a tire that is attached to a wheel of a vehicle while the vehicle is traveling, including:

an information acquiring part for acquiring tire information on the tire during rotating while the vehicle is traveling;

a deriving part for deriving a deformation amount of a contact-portion of the tire based on the tire information, the contact-portion being in contact with the ground;

a calculating part for calculating an evaluation value for determining a presence or absence of the internal mechanical failure based on the derived deformation amount; and a determining part for comparing the calculated evaluation value with a predetermined reference value to determine whether or not the internal mechanical failure has occurred in the tire, wherein the information acquiring part acquires acceleration data of a predetermined portion of the tire in time series as the tire information, said acceleration data generated when the tire receives an external force from a road surface during rotating while the vehicle is traveling, and wherein the deriving part extracts acceleration data due to a deformation of the tire in time series from the acceleration data of the tire in time series acquired in the information acquiring part, and performs a second-order time integration with respect to the acceleration data due to the deformation of the tire to obtain displacement data, thereby calculating the deformation amount of the contact-portion of the tire.

4. The apparatus according to claim 1, wherein the information acquiring part acquires separately, as the tire information, tire information on the predetermined portion of the tire in a tire circumferential direction orthogonal to the tire radial direction and the tire width direction during rotating while the vehicle is traveling in addition to the tire information on the tire in the tire radial direction and the tire width direction, wherein the deriving part derives a deformation amount of the contact-portion of the tire in the tire circumferential direction based on the tire information on the tire in the tire circumferential direction, the tire radial direction and the tire width direction in addition to the deformation amount of the contact-portion of the tire in the tire width direction, and obtains deformation amounts of the contact-portion in two directions of the tire circumferential direction and a tire width direction, respectively, and wherein the calculating part calculates the evaluation value based on the deformation amounts in said two directions.

5. The apparatus according to claim 4, wherein the calculating part calculates a value represented by using one of $X_{max}/Y_{max}$ and $Y_{max}/X_{max}$ as the evaluation value, $X_{max}$ being a maximum value of the deformation amount of the contact-portion in the tire circumferential direction, and $Y_{max}$ being a maximum value of the deformation amount of the contact-portion in the tire width direction.

6. The apparatus according to claim 5, wherein the calculating part calculates a value represented by using one of $\tan^{-1}(X_{max}/Y_{max})$ and $\tan^{-1}(Y_{max}/X_{max})$ as the evaluation value.

7. The apparatus according to claim 4, wherein the calculating part calculates a value represented by $X_{max} \times Y_{max}$ as the evaluation value, $X_{max}$ being a maximum value of the deformation amount of the contact-portion in the tire circumferential direction and $Y_{max}$ being a maximum value of the deformation amount of the contact-portion in the tire width direction.

8. The apparatus according to claim 4, wherein the calculating part calculates the evaluation value based on respective maximum values of the deformation amounts of the contact-portion in the tire circumferential direction and tire width direction.

9. The apparatus according to claim 1, wherein the calculating part calculates the evaluation value based on a maximum value of the deformation amount of the contact-portion in the tire width direction.

10. A method of detecting an internal mechanical failure of a tire that is attached to a wheel of a vehicle while the vehicle is traveling, including:

acquiring tire information on a predetermined portion of the tire at least in a tire radical direction and a tire width direction orthogonal to the tire radical direction during rotating while the vehicle is traveling, respectively;

deriving a deformation amount of a contact-portion of the tire at least in the tire width direction based on the tire information, the contact-portion being in contact with the ground;

calculating an evaluation value for determining a presence or absence of the internal mechanical failure based on the derived deformation amount of the tire at least in the tire width direction by the deriving step; and comparing the calculated evaluation value by the calculating step with a predetermined reference value to determine whether or not the internal mechanical failure has occurred in the tire.

11. The apparatus according to claim 1, wherein the tire information is acceleration data.

12. The apparatus according to claim 11, further including an acceleration sensor placed on an inner surface of the predetermined portion of the tire for measuring the acceleration data of the predetermined portion in the tire radial direction and the tire width direction, respectively.

13. The apparatus according to claim 12, further including a transmitter provided in the wheel, the transmitter transmitting the acceleration data measured by the acceleration sensor to the information acquiring port by wireless; and wherein the information acquiring part includes a receiver for receiving the acceleration data transmitted by wireless.

14. The apparatus according to claim 12, wherein the acceleration sensor further measures the acceleration data of the predetermined portion in the tire circumferential direction in addition to the acceleration data of the predetermined portion in the tire radial direction and the tire width direction.

15. A method of detecting an internal mechanical failure of a tire that is attached to a wheel of a vehicle while the vehicle is traveling, comprising;

acquiring tire information on the tire during rotating while the vehicle is traveling;

deriving a deformation amount of a contact-portion of the tire based on the tire information, the contact-portion being in contact with the ground;

calculating an evaluation value for determining a presence or absence of the internal mechanical failure based on the derived deformation amount; and comparing the calculated evaluation value with a predetermined reference value to determine whether or not the internal mechanical failure has occurred in the tire, wherein the acquiring step is a step of acquiring acceleration data of a predetermined portion of the tire in time series as the tire information, said acceleration data generated when the tire receives an external force from a road surface during rotating while the vehicle is traveling, and wherein the deriving step is a step of extracting acceleration data due to a deformation of the tire in time series from the acceleration data of the tire in time series acquired in the acquiring step, and performing a second-order time integration with respect to the acceleration data due to the deformation of the tire to obtain displacement data, thereby calculating the deformation amount of the contact-portion of the tire.

* * * * *